United States Patent [19]

Pomerantz et al.

[11] 4,372,054
[45] Feb. 8, 1983

[54] METHOD AND MEANS FOR PROGRAMMING THE OPERATION OF AN APPARATUS

[75] Inventors: Daniel I. Pomerantz, Lexington, Mass.; Richard V. Baxter, Jr., Indianapolis, Ind.

[73] Assignee: Emhart Industries, Inc., Indianapolis, Ind.

[21] Appl. No.: 230,736

[22] Filed: Feb. 2, 1981

[51] Int. Cl.³ .............................................. F26B 21/06
[52] U.S. Cl. ........................................ 34/44; 34/89; 34/133; 340/802
[58] Field of Search ............... 340/365 VL, 712, 802, 340/286 M; 34/88, 89, 133, 48, 43, 44

[56] References Cited

U.S. PATENT DOCUMENTS 3,974,472  8/1976  Gould .............................. 340/802
4,224,615  9/1980  Penz ............................. 340/365 C
4,275,508  6/1981  Jones ................................. 34/48

Primary Examiner—Larry I. Schwartz
Attorney, Agent, or Firm—Robert F. Meyer; David W. Gomes

[57] ABSTRACT

A method and means for programming the operation of an apparatus having at least a plurality of different control functions provides a control panel, an arrangement for causing the control panel to appear blank prior to initial activation of the apparatus, circuitry for initially activating the apparatus, and circuitry responsive to initial activation for indicating and allowing selection of the different control functions, the circuitry for indicating and allowing selection including circuitry for sequentially displaying the control functions on the control panel to allow selection thereof.

12 Claims, 16 Drawing Figures

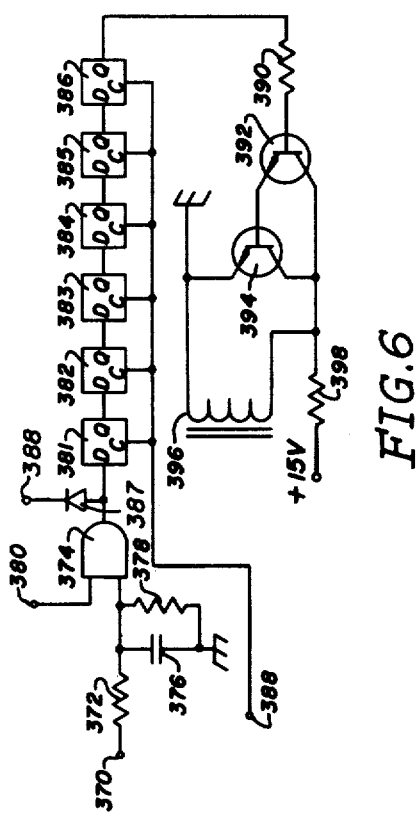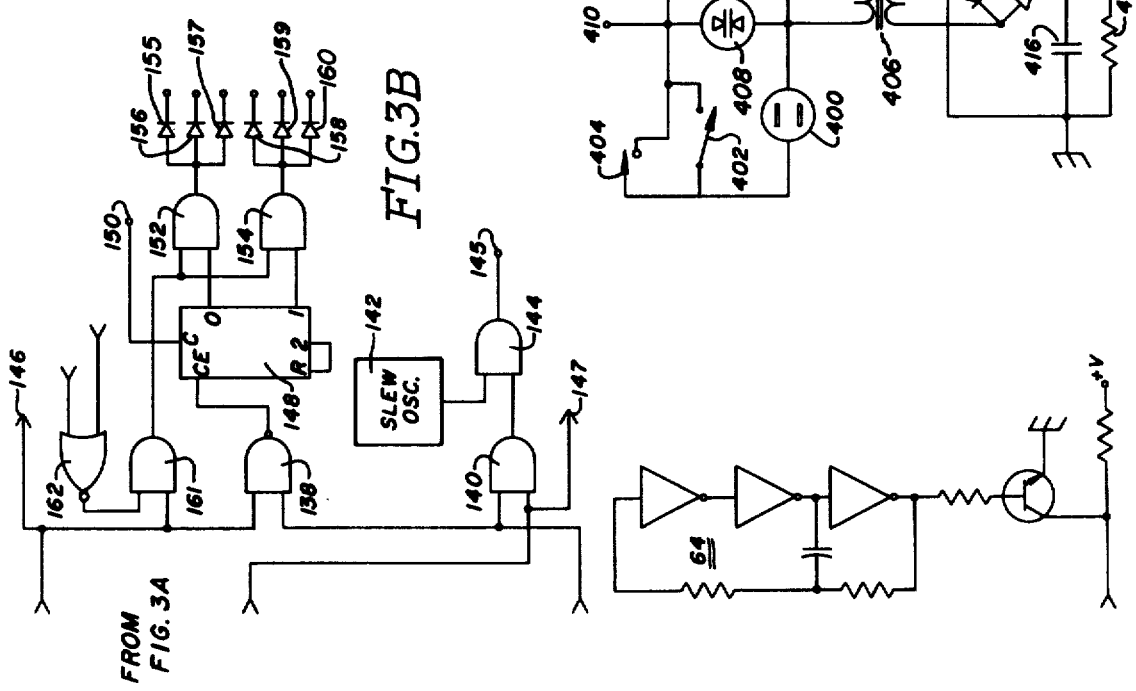

TO FIG.4B

METHOD AND MEANS FOR PROGRAMMING THE OPERATION OF AN APPARATUS

BACKGROUND OF THE INVENTION

1. Field of the Invention

This invention generally relates to multifunction apparatuses and, in particular, to such apparatuses which include means for programming selections of the various control functions prior to operation of the apparatus.

2. Statement of the Prior Art

Multifunction apparatuses have been in common usage in the form of tools or appliances for some time. Many of these apparatuses include means for programming selections of their various control functions prior to operation of the apparatus. Examples of such apparatuses vary from the simplest form including perhaps two selectable control functions to apparatuses, such as appliances, which include as many as a dozen interrelated control functions. These apparatuses include input means for inputting selections of the various control functions, which input means vary in complexity in accordance with the number of selectable functions present. As the number of selectable functions increases, the amount of programming necessary prior to activation of the apparatus correspondingly increases. On more complicated apparatuses, such as home appliances having a wide choice of selectable functions, the amount of input control means and programming necessary to operate the appliance can become quite complex, easily lending itself to the introduction of error in the use of the appliance. This condition is aggravated by the fact that the users of such complicated appliances are often non-technically oriented consumers. As the popularity of such "top of the line" appliances increases due to the greater flexibility and control included therein, the importance of reducing the probability of errors occurring in the programming of the apparatus greatly increases.

SUMMARY OF THE INVENTION

Accordingly, the present invention is applicable to apparatuses having at least a plurality of different control functions and includes a control panel, means for causing the control panel to appear blank prior to initial activation of the apparatus, means for initially activating the apparatus, and means responsive to the means for initially activating for indicating and allowing selection of the different control functions, the means for indicating and allowing selection including means for sequentially displaying the control functions on the control panel to allow sequential selection thereof.

The method of the present invention for displaying selectable control functions of an apparatus, comprises the steps of causing a control panel including means for displaying the control functions to appear blank prior to initial activation of the apparatus, and causing the control functions to be sequentially displayed on the control panel after initial activation of the apparatus.

BRIEF DESCRIPTION OF THE DRAWINGS

The present invention is illustratively described in the accompanying drawings in which:

FIGS. 34A–3B, 4A, 4B, 5, 6, 7, 8 and 9 are schematic diagrams of a control circuit for the control panel shown in FIG. 1.

DETAILED DESCRIPTION OF THE DRAWINGS

Figure 1:
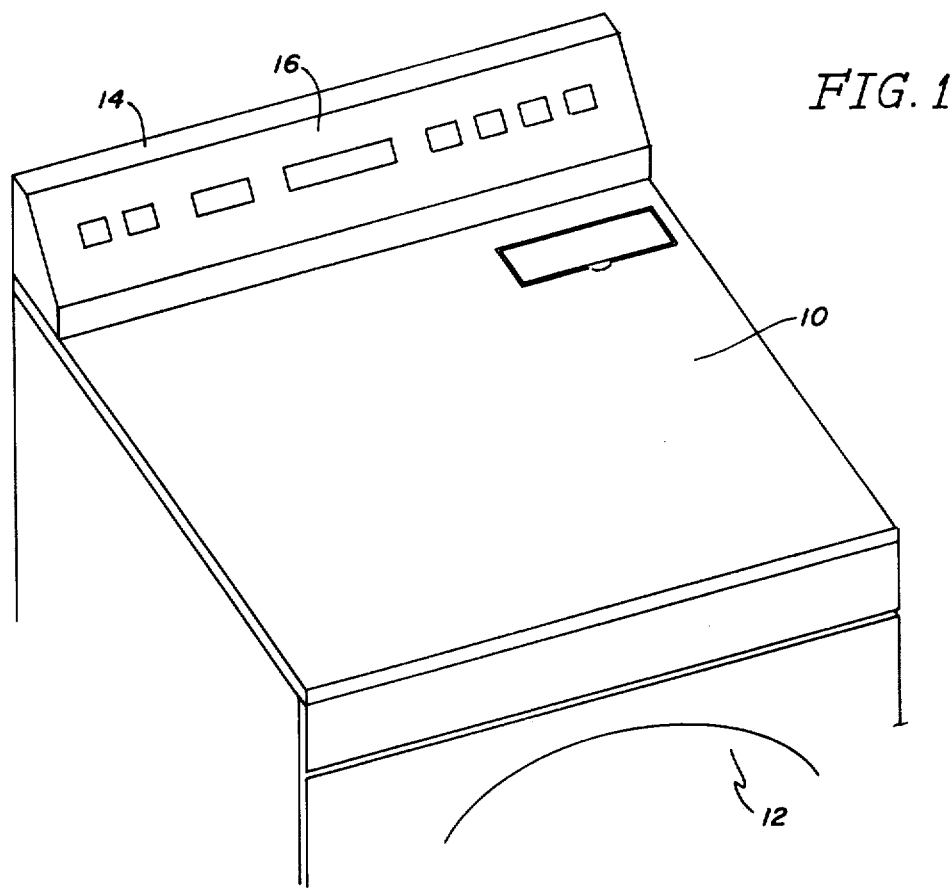
FIG. 1 is a perspective view of a control panel for an appliance according to one embodiment of the present invention.
Figure 2A:
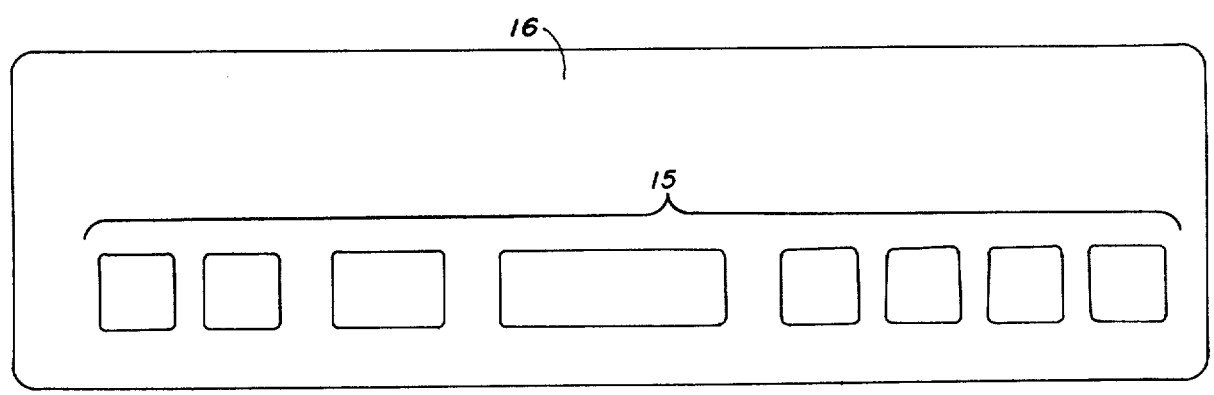
FIGS. 2A–2F are close-up views of the control panel of FIG. 1 with each Figure displaying a different condition thereof.

FIG. 1 gives a perspective view of a portion of an apparatus, in this case an appliance 10 constructed according to one embodiment of the present invention. The appliance 10 is depicted as a clothes dryer having a cubical shape with a front opening door 12 and a control console 14 mounted on top and towards the rear of the appliance. The control console 14 includes a control panel 16 facing the front of the appliance and slightly upward. The control panel 16 appears substantially blank, apparently devoid of any input controls, such as knobs or switches, and any indication of the various control functions available with the drying apparatus. A plurality of touch pads 15 of FIG. 2A are located on the panel 16; however, due to the absence of any visible information or indications, the touch pads 15 merely appear to be part of a decorative design. The blank control panel 16 thereby conforms to the generally clean or contemporary styling of the rest of the apparatus 10.

FIGS. 2A through 2F are a series of views of the control panel 16 as it is intended to appear under different programming conditions of the control functions of apparatus 10. FIG. 2A shows the control panel 16 as it appears in FIG. 1. This represents the condition of the apparatus prior to initial activation, and as shown, the panel 16 appears substantially blank, devoid of any indication of the selectable control functions and any obvious control mechanisms.

Figure 2B:
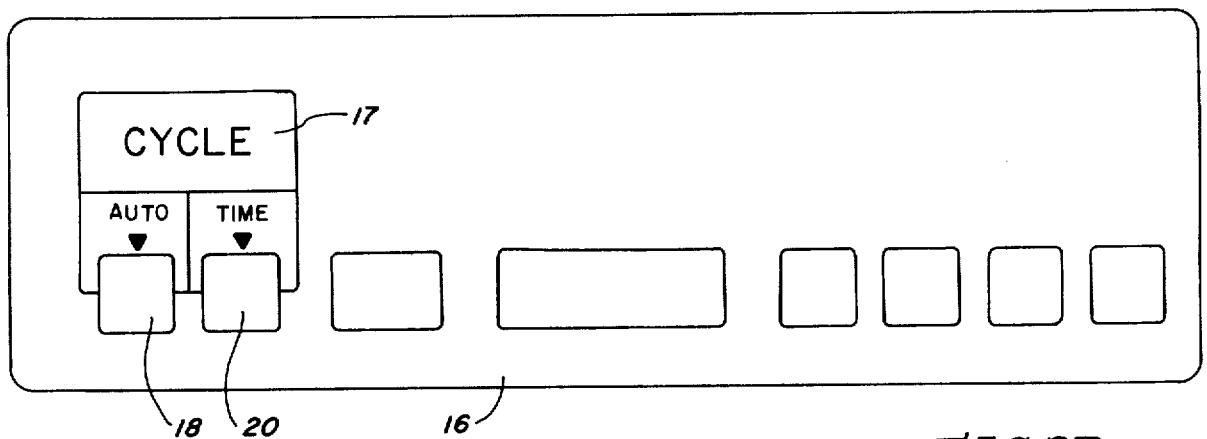

FIG. 2B shows the condition of the control panel 16 immediately after initial activation of the apparatus 10 with the cycle selection area 17 illuminated. Initial activation may be triggered by the opening and/or closing of the front opening door 12. The initial choice shown in FIG. 2B is whether the dryer is to be operated in either the automatic or the timed mode. Selection of either mode is accomplished by the operator pressing either of the touch pad sensors 18 and 20 appearing immediately below the available selection. Each of the touch pad sensors indicated herein is a separate one of the plurality of touch pads 15 referred to above.

Figure 2C:
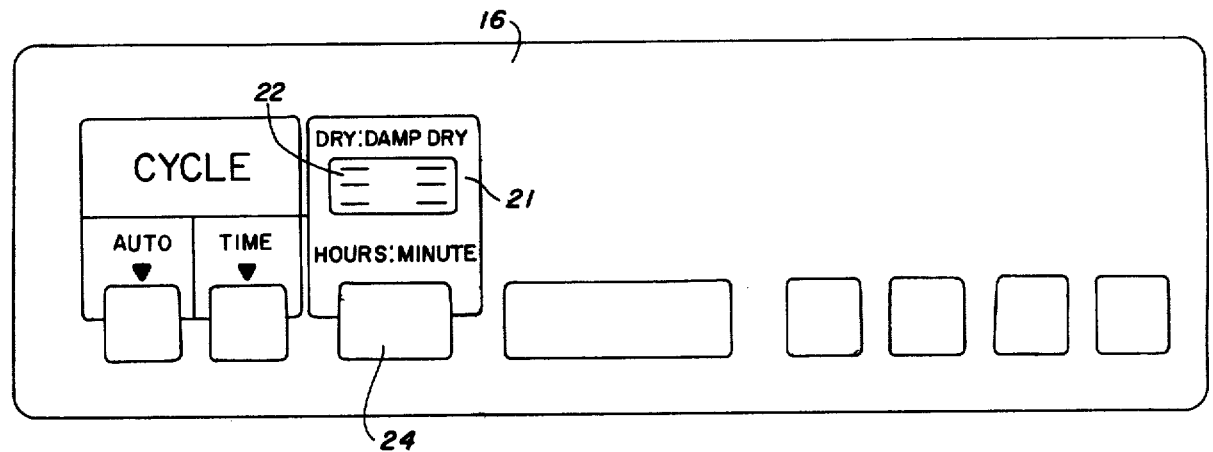

FIG. 2C shows the condition of control panel 16 after a selection of either the automatic or timed cycle function is made. The making of this selection causes the display area 21 to appear. The display are 21 includes a three digit, seven segment numeric display 22 and a pair of legends "DRY:DAMP DRY" and "HOURS:MINUTES." When an automatic cycle is selected, the former appears, and when a timed cycle is selected, the latter appears. A touch pad sensor 24 is located beneath the display area 21. When the automatic cycle is in use and the sensor 24 is touched, several segments of the left most digit and several segments of the right most digit of display 22 alternately flash. To select a dryness level, the operator need only remove this finger from sensor 24 when the segments under the desired dryness level are lighted. When the timed cycle is selected and the sensor 24 is touched, a drying time appears in the display 22 and slews upwardly in ten minute intervals. When the desired drying time is reached, the operator need only remove his finger from the sensor 24. The numeric display 22 is also used in determining the delay time for a delayed start, which use is described below in detail.

Figure 2D:
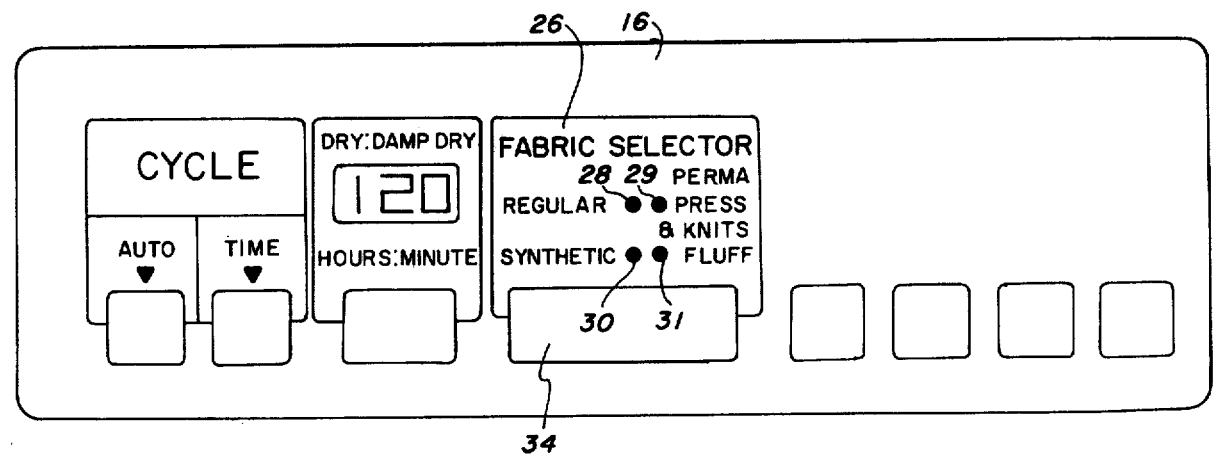

FIG. 2D shows the condition of control panel 16 after a selection is made of either the dryness level or the operating time. At this point in the programming, the operator is requested to program the fabric type by the appearance of the display section 26. The display section 26 may either by labelled "Fabric Select" with selections such as "Regular, Permanent Press, Synthetics," and "Air Fluff," or "Temperature" with selections of "High, Medium, Low," and "Air," which correspond to the fabric types previously listed. A touch pad sensor 34 is located beneath display section 26 to allow selection of the fabric type or temperature. When the sensor 34 is touched, light means 28 through 31 are sequentially illuminated. The operator need only remove his finger from the sensor 34 when the light for the proper fabric or temperature is illuminated.

Figure 2E:
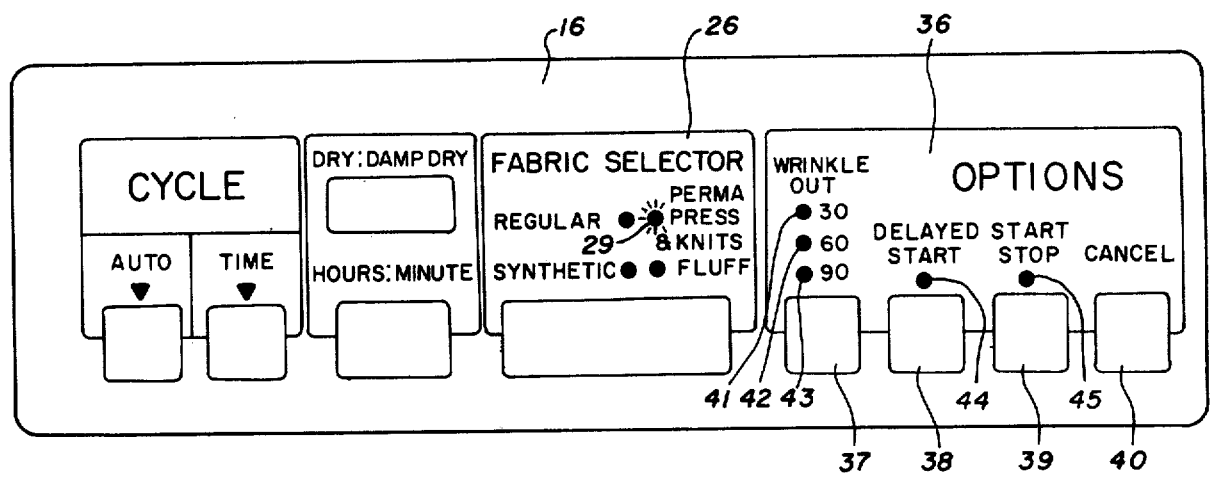

FIG. 2E shows the condition of the control panel 16 after a selection for air temperature or fabric type has been made as signified by the sole illumination of lamp 29 in the display area 26. At this time, the various additional options are displayed in display area 36. The options displayed for the current embodiment are "Wrinkle-out, Delayed Start, Start-Stop and Cancel." These functions are each displayed in the area 36 above one of the touch pad sensors 37 through 40 located along the lower edge of section 36. Directly beneath the "Wrinkle Out" display are located three indicator lights 41, 42 and 43 and an indication of time for operation of the function for each light. The available times are 30, 60 and 90 minutes. To choose the "Wrinkle Out" function, the operator need only touch the sensor 37, whereupon the indicator lights 41–43 are sequentially illuminated. When the light 41–43 next to the desired time is illuminated, the operator need only remove his finger from the sensor 37 to choose that period of operation for the "Wrinkle Out" function.

The "Delayed Start" option is located next to the "Wrinkle Out" option in display area 36. To select this option, the operator touches the sensor 38. This immediately records any selected drying time appearing in display 22 and slews available delay times through that display 22. The delay times are available in one hour intervals up to 9 hours. Selection of the "Delayed Start" option is displayed by a single indicator light 44.

The "Start-Stop" function is displayed next to the "Delayed Start" option and is located directly above the sensor 39. Touching the sensor 39 when the option area 36 is illuminated initiates functional operation of the dryer and illuminates an indicator 45. Touching the sensor 39 a second time, or while the dryer is operating, causes the dryer to stop operating and the indicator 45 to be extinguished.

The "Cancel" function is displayed next to the "Start-Stop" function and directly above sensor 40. If for any reason the operator wishes to change any of the programmed information, he need only press the sensor 40 and all of the programmed information will be eliminated. Only the cycle display area will be illuminated and the operator can then reprogram the apparatus 10.

Figure 2F:
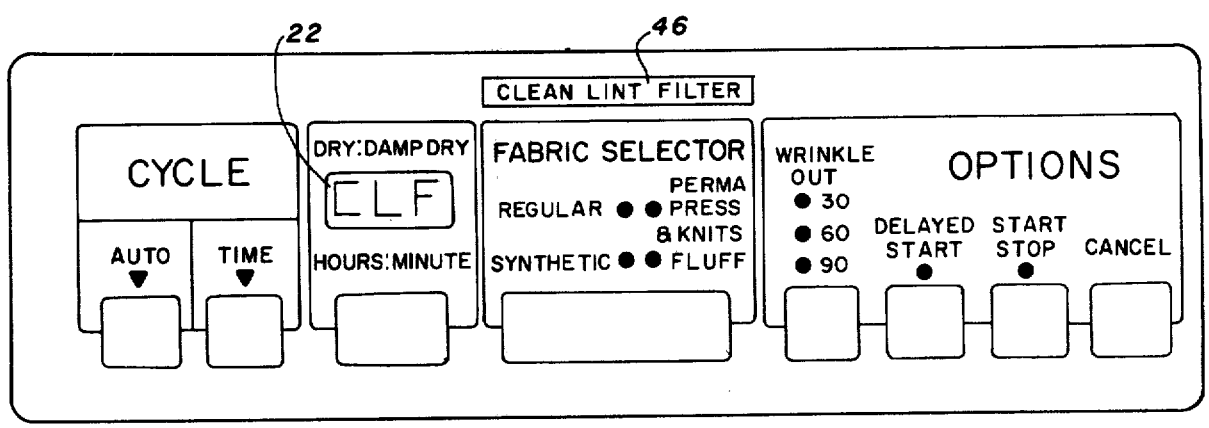

FIG. 2F shows the condition of control panel 16 when the lint filter of the dryer becomes too full for economic operation of the dryer. Under such conditions, the control circuitry can be used to illuminate either the seven segment display 22 with the letters CLF corresponding to clean lint filter or by illumination of a separate section 46 of the control panel 16 which section 46 includes the instruction to clean the lint filter. At the occurrence of this condition, an alarm may also be sounded. Thus, the operator is made aware of the existence of such inefficient or even dangerous operating conditions.

Figure 3A:
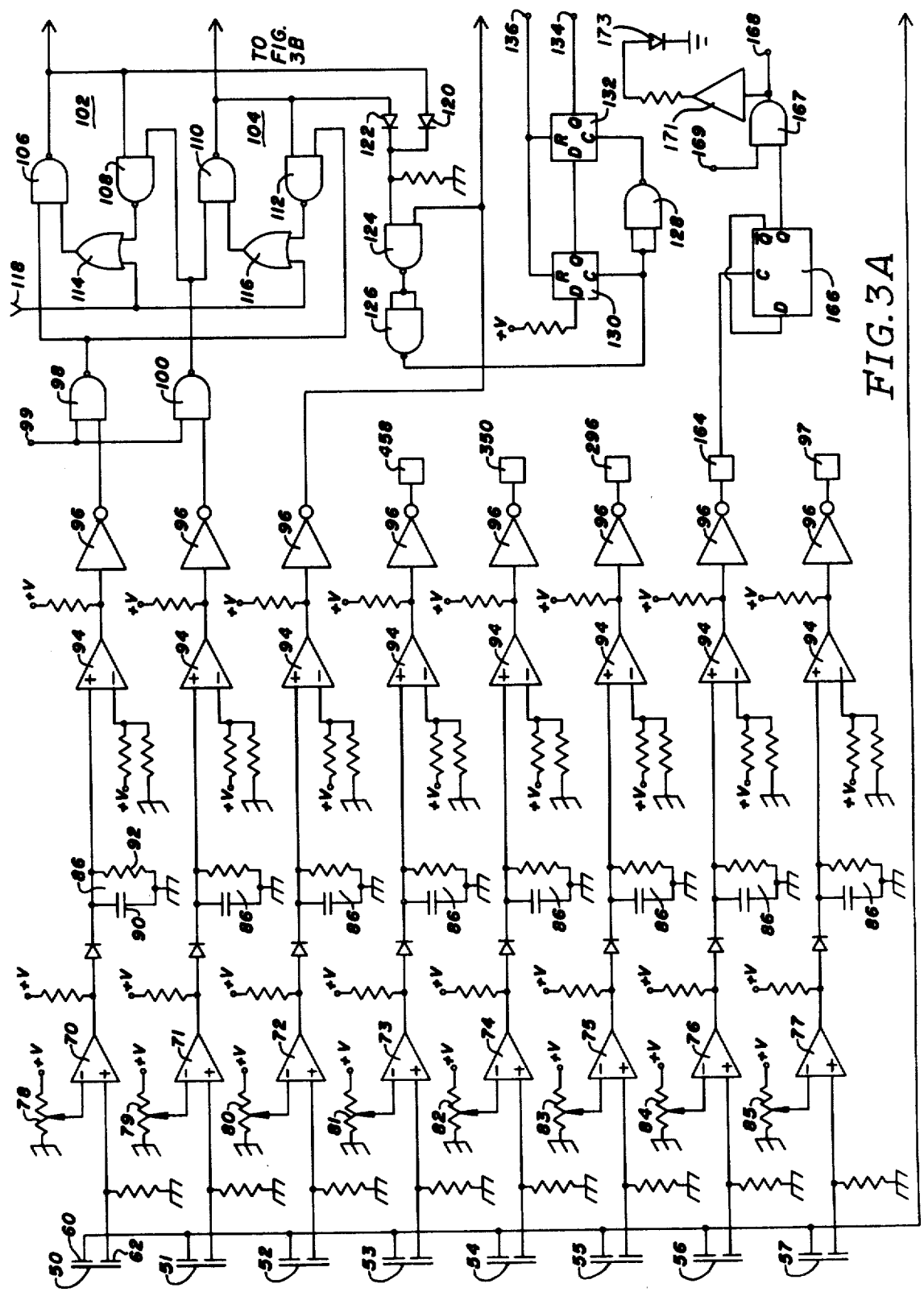

FIG. 3A–3B shows a portion of the control circuit for operating control panel 16. The circuit shows a series of capacitance sensitive touch switches 50 through 57 which correspond to the sensors 18, 20, 24, 34, 37, 38, 39 and 40. The switches each include a central element 58 which is capacitively coupled to a pair of connector elements 60 and 62. Each of the connector elements 60 is connected to the output of an oscillator circuit 64. Various different oscillator circuits are sufficient for performing the function of the oscillator 64, which generates a square wave pulse signal at a frequency of approximately 100 KHz. In the present embodiment, a standard CMOS gate is used with discrete components to form the oscillator circuit 64. Each of the connector elements 62 of the capacitance touch switches 50 through 57 is connected to the positive input of a separate voltage comparator circuits 70 through 77, respectively.

Separate voltage divider circuits 78 through 85, comprising potentiometers connected across a fixed voltage potential, are connected to the negative inputs of voltage comparators 70 through 77 to set up a reference voltage against which the signal from each of the capacitance touch switches 50 through 57 is compared. When any one of the capacitance touch switches 50 through 57 is being touched, the pulse signal from oscillator 64 is partially shunted to ground and only a reduced signal appears at its respective voltage comparator 70 through 77. When the capacitance sensor is not being touched, the pulse signal from oscillator 64 is coupled through to its respective voltage comparator and causes a pulse wave output to appear therefrom. The outputs of the voltage comparators 70 through 77 are each connected to a separate R-C circuit exemplified as 86. The circuitry 86 includes a diode 88 having its anode connected to the output of the respective voltage comparator, a capacitor 90 and a resistor 92 connected in parallel, with one end of the combination connected to the cathode of diode 88 and the other end of the combination connected to ground. The connection between the three components is in turn connected to the positive input of another series of voltage comparators exemplified by 94. The negative input thereof is connected to another voltage divider 95 for the purpose of setting up a reference voltage. The R-C circuits 86 take the pulse waves from the outputs of the voltage comparators 70–77 and filter high frequencies therefrom. Thus, while a touch sensor 50–57 remains unactivated, the signal received by voltage comparators 70–77 results in a pulse wave output therefrom. This pulse wave output is filtered by the circuits 86 causing a constant positive voltage to appear at the input of the respective comparator 94 and thus a positive voltage or logical high to appear at the output thereof. When a touch sensor 50–57 is activated a constant low or zero voltage signal appears at the output of the respective amplifier 70–77 which low voltage causes a constant logical low signal to appear at the output of the respective comparator 94, thus signalling activation of the respective touch sensor. A plurality of schmidt triggers exemplified by 96 are individually connected to the outputs of the voltage comparators 94 for purposes of signal inversion and noise immunity. Thus, a logical high at a schmidt trigger output signals activation of the respective touch sensor and a logical low represents no activation.

The capacitance touch switch 50 inputs the selection of the automatic operating function, and its respective schmidt trigger 96 is connected to one input of a NAND gate 98. The capacitance touch sensor 51 inputs the selection of the timed operating mode of the apparatus 10 and the output of its respective schmidt trigger 96 is connected to one input of a NAND gate 100. The other inputs of both NAND gates 98 and 100 receive the cycle enable signal through a terminal 99 which is generated upon initial activation of the apparatus such as by opening the door 12. The outputs of NAND gates 98 and 100 are each connected to a separate input of two bistable memory gates 102 and 104 each of which is formed by a pair of NAND gates 106, 108 and 110, 112, respectively. The bistable memory gates further each include an OR gate 114, 116. The OR gates 114 and 116 allow the inputting of a system reset signal via terminal 118.

The outputs of each of the memory circuits 102 and 104 is connected through a diode 120, 122, respectively, to one input of a NAND gate 124 The output of NAND gate 124 is connected to both inputs of a NAND gate 126 thereby causing it to operate as an inverter circuit. The output of NAND gate 126 is connected to both the inputs of another NAND gate 128 and to the clock input of a D-type flip-flop 130. The output of NAND gate 128 is connected to the clock input of another D-type flip-flop 132. The D input of flip-flop 130 is connected to a positive reference voltage causing a logical one to appear at the Q output of flip-flop 130 when the clock input C receives a low-high transition. The D input of flip-flop 132 is connected to the Q output of flip-flop 130. When a logical high is present at the D input of flip-flop 132 and a low-high transition is received at its clock input the Q output becomes a logical high. The Q output of flip-flop 132 is present at terminal 134 and represents the fabric selector enable signal (or the temperature selector enable signal). The reset of flip-flops 130 and 132 is connected in common and to the system reset signal via terminal 136.

Another input touch switch 52 corresponds to the input sensor 24 and is coupled through its respective schmidt trigger 96 to the other input of NAND gate 124, one input of NAND gate 138, and one input of AND gate 140. As mentioned, the input switch means 24 slews either the time for a time mode drying operation or the dryness level for an automatic drying operation. The time period slew is effected through AND gate 140 which has its other input connected to the output of memory gate 104. The output of AND gate 140 and a low frequency slew clock signal from a generator 142 form the inputs for another AND gate 144. The output of AND gate 144 is connected through a terminal 145 to the clock input of the tens of minutes counter described bwlow. The outputs of memory gates 102 and 104 are also available on terminals 146 and 147, respectively. Any suitable low frequency clock may be used for the generator 142. The output frequency is approximately 2-3 hertz.

The automatic dryness level indicator is controlled through NAND gate 138, the other input of which is connected to the output of memory gate 102. The output of NAND gate 138 is connected to the clock enable input of a decade counter 148 having ten decoded outputs. The clock input for decade counter 148 is connected to the slew clock signal through input terminal 150. The "0" to "1" outputs of decade counter 148 are each connected to separate AND gates 152 and 154, respectively. The "2" output of counter 148 is connected to reset input of counter 148 thereby causing the counter to reset when the "2" digit is reached. The outputs of AND gates 152 and 154 are connected to diodes 155, 156, 157 and 158, 159, 160, respectively. Diodes 155 to 160 are used for isolation and their other ends are intended for connection to drivers for the a, d and g segments, respectively, of the most and least significant digits of display 22. As the outputs of AND gates 152 and 154 are alternately pulsed so are display segments under the automatic dryness levels. This allows the apparatus operator to choose an automatic drying level. The other inputs of AND gates 152 and 154 are both connected to the output of AND gate 161 which has as its inputs the output of memory gate 102 and the output of a NOR gate 162. Gate 161 enables the signals to segments a, d and g described above when the automatic dryness level mode is selected, while NOR gate 162 disables the dryness level segments when other certain conditions are to be displayed. These conditions are described below.

Further in FIG. 3A, sensor switch 56, corresponding to the START/STOP touch sensor 39 of FIG. 2F, is coupled through its respective circuitry to a terminal 164 which is in turn connected to the clock input of a D-type flip-flop 166. The Q output of flip-flop 166 is connected to its D input and the Q output is connected through an AND gate 167 to a terminal 168. Another input of AND gate 167 is connected to a terminal 169. An amplifier 171 has its input connected to the output of AND gate 167 and its output connected through a resistor to a light emitting diode 173 which operates as the indicator 45 on control panel 16. The flip-flop 166 controls the Start-Stop function of the apparatus 10. Activating switch 56 a first time causes the Q output of flip-flop 166 to become a logical 1. Activating switch 56 a second time causes the same Q output to become a logical 0. The terminal 169 is intended to receive an enable signal once the essential programming of the apparatus 10 is complete.

Figure 4A:
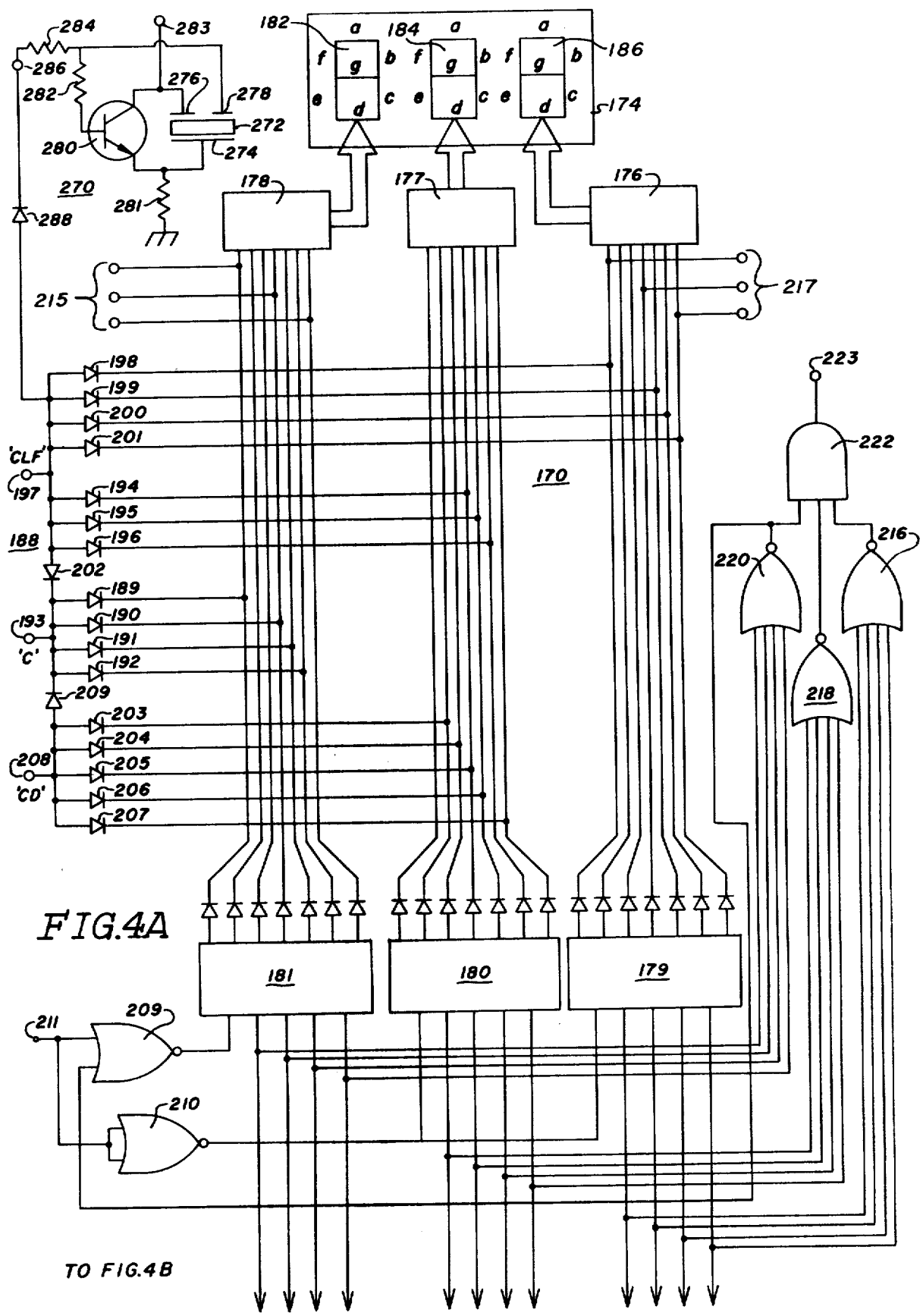
Figure 4B:
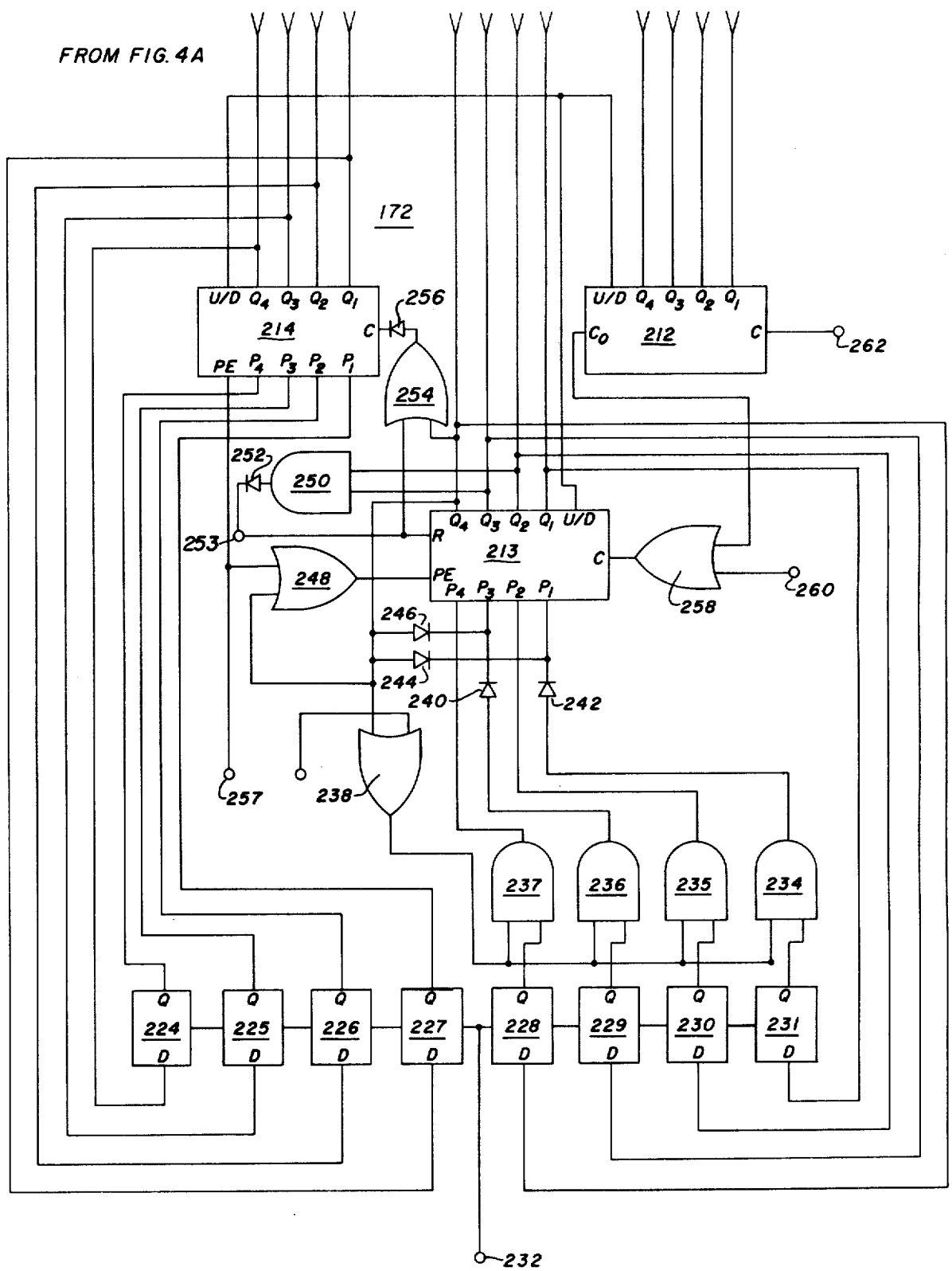

FIGS. 4A–4B shows another portion of the control circuit for control panel 16. FIG. 4 generally includes a display section 170 and a counter section 172. The display section is comprised of a three digit seven segment light emitting diode display 174, three drivers 176 through 178, and three binary coded decimal to seven segment decorders 179 through 181. The three digit seven segment display includes an hours digit 182, a tens of minutes digit 184 and a minutes digit 186. The display signals, in seven segment code are coupled to the drivers 176 to 178, from the decoders 179 to 181 and from a group of decoders 188 which represent special display functions. The decoders 188 each comprise a plurality of diodes which are connected to selected segments of selected digits to display specific signals. For example, a decoder is comprised of diodes 189 to 192 connected respectively to segments a, d, e and f of the hours digit 182 When a positive logic signal is inputted on terminal 193, the diodes 189 through 192 cause a "C" to appear in digit 182. Diodes 194, 195 and 196 are connected to the d, e and f segments of the tens of minutes digit 184 to cause an "L" to appear in digit 184 when a positive logic signal is inputted on terminal 197. Diodes 198 through 201 are connected to segments a, e, f and g of digit 186 to cause an "F" to appear therein upon the presence of a positive logic signal at terminal 197. The presence of such a signal at terminal 197 is also connected through a diode 202 to the decoder of diodes 189 through 192 and thereby causes a complete signal of "C L F" to appear in the digits 182, 184, 186 representing a signal to the dryer operator that the lint filter needs to be cleaned. Diodes 203 through 207 are connected to the b, c, d, e and f segments of digit 184 for causing a "d" to appear therein when a positive logic signal appears on input terminal 208. Upon receipt of such a signal, diodes 189 through 192 are also activated through the coupling of diode 209 and a "Cd" signal representing the cool down function of the dryer is caused to appear in digits 182 and 184. To enable the display of these special signals, the decoders 179 through 181 may be blanked to prevent any interference from numbers present in the counting section 172. For this purpose. a NOR gate 209 has its output connected to the not blank input terminal of decoder 181 and a NOR gate 210 has its output connected to the not blank input terminal of decoders 179 and 180. The inputs of NOR gate 210 and one of the inputs of NOR gate 209 receive a signal from terminal 211 which is connected to the output of terminal 146 from memory gate 102.

Terminals 215 and 217 are shown in FIG. 4A for connection to diodes 155 through 160 in FIG. 3B. During displays of the "CLF", "C", and "CD" notices, the automatic dryness level indicators of FIG. 3B are disabled by connection of the terminals 197 and 208 to the separate inputs of NOR gate 162.

The binary coded decimal to seven segment decoders 179 to 181 receive binary coded input signals from the counter section 172; more specifically, from three counters 212, 213 and 214, respectively. The signals are represented as a four digit binary number using four lines from each of the counters to each of their respective decoders. Also connected to these binary coded signal lines are three NOR gates 216, 218 and 220. The outputs of NOR gates 216, 218 and 220 are each connected to a separate input of an AND gate 222. The output of AND gate 222 is a signal which represents completion of the timing function. This "done timing" signal is available at terminal 223 and is generated when each of the binary coded signal lines is a logical zero, as is the case when the time in each of the counters 212, 213 and 214 has reached zero. The counters are at zero both at the end of a timing function and when initially reset. The output of NOR gate 220 is also connected to another input of NOR gate 209 for the purpose of blanking the hours digit 182 when less than one hour remains to be timed.

Each of the counters 212, 213 and 214 is a binary coded decimal counter having four outputs representing the digits 0 through 9 in binary coded form. Each of the counters 212, 213 and 214 includes a clock input which causes each of the counters to increment when pulsed. The counters further include up/down inputs which control the direction of count for each of the counters. The counters 213 and 214 also include preset inputs for each of their binary coded digits to enable the inputting of specific numbers upon receipt of a siganl on each of their respective preset enable inputs. This function allows the inputting of a recorded drying time after a delay time has been counted out and also allows the tens of minutes digit to be reset to a five during a countdown function at the beginning of each hour. When a delay start function is selected, a series of D-type flip-flops 224 through 231 store the selected drying time by having their D inputs connected to the respective binary outputs of counters 214 and 213 and by the receipt of a pulse signal on their clock input from terminal 232. The outputs of D-type flip-flops 224 through 227 are connected to the preset inputs of counter 214 for re-inputting the selected drying time to that counter upon receipt of a preset enable signal at the end of a delay start countdown. D-type flip-flops 228 through 231 have their respective outputs coupled to the preset inputs of counter 213 for the same purpose. The preset inputs of counter 213 are coupled to and through a series of AND gates and diodes to the respective outputs of D-type flip-flops 228 through 231 for the purpose of performing additional functions.

More specifically, the preset inputs of counter 213 have a pair of diodes 242, 244 and 240, 246 connected to each of the first and third least significant digit inputs thereof. The other side of one diode 242, 240 of each of these pairs is connected to the output of an AND gate 234 and 236, respectively. The remaining preset inputs have the outputs of similar AND gates 237 and 235 connected thereto. The AND gates 234-237 each has the output of one D type flip-flop 228 through 231 as one input thereof. Another input of each of the AND gates 234-237 is connected to the output of a NOR gate 238. The other two diodes 244 and 246 perform the preset of the number "5" during a countdown function. Their other ends are connected in common and to the most significant digit output of counter 213. During a countdown function when the counter goes from 0 to 9, the most significant digit is activated with a logical high which is coupled through diodes 244 and 246 to allow a "5" to be preset into the counter 213. The most significant digit output of counter 213 is also connected to one input of an OR gate 248, the output of which is connected to the preset enable input of counter 213. Thus, during a countdown function a "5" is preset at the preset inputs when the zero count is passed. AND gate 250 has a pair of inputs connected to the second and third least significant output digits of counter 213 and has its output connected through a diode 252 to the reset input of counter 213. The AND gate 250 output is also coupled through an OR gate 254 and diode 256 to the clock input of counter 214. Thus, when the count of 6 is reached at the output of counter 213, the counter 213 is reset to 0 and the hours counter 214 is clocked. The preset enable input signal is otherwise coupled through a terminal 257 directly to the preset enable input of counter 214 and through the OR gate 248 to the preset enable input of counter 213.

The units of minutes counter 212 generates the clock signal for counter 213 from its clock output terminal coupled through an OR gate 258 to the clock input of counter 213. Slewing of tens of minutes is accomplished by a signal including the slew clock signal connected from terminal 145 of FIG. 3B to terminal 260 and therefrom to another input of OR gate 258. The units of minutes clock 212 is driven by a one cycle per minute signal connected to its clock input from a terminal 262.

FIG. 4 also shows an alarm circuit 270 which is available for activation under different conditions. The alarm circuit 270 includes a piezoelectric crystal 272 having first and second main terminals 274 and 276 and a feedback terminal 278. A transistor 280 has its emitter and collector electrodes connected to the first and second main terminals 274 and 276, respectively. The feedback terminal 278 is connected to the base of transistor 280 through a resistor 282. Another resistor 284 connects the alarm circuit 270 to a terminal 286 for allowing activation of the alarm. Terminal 286 is shown connected through an isolation diode 288 to the "CLF" terminal 197. Thus, when a clean lint filter signal is generated, the alarm circuit 270 is activated. The collector of transistor 280 is connected to a positive voltage potential via a terminal 283 and the emitter of transistor 280 is connected to a ground potential through a resistor 281.

Figure 5:
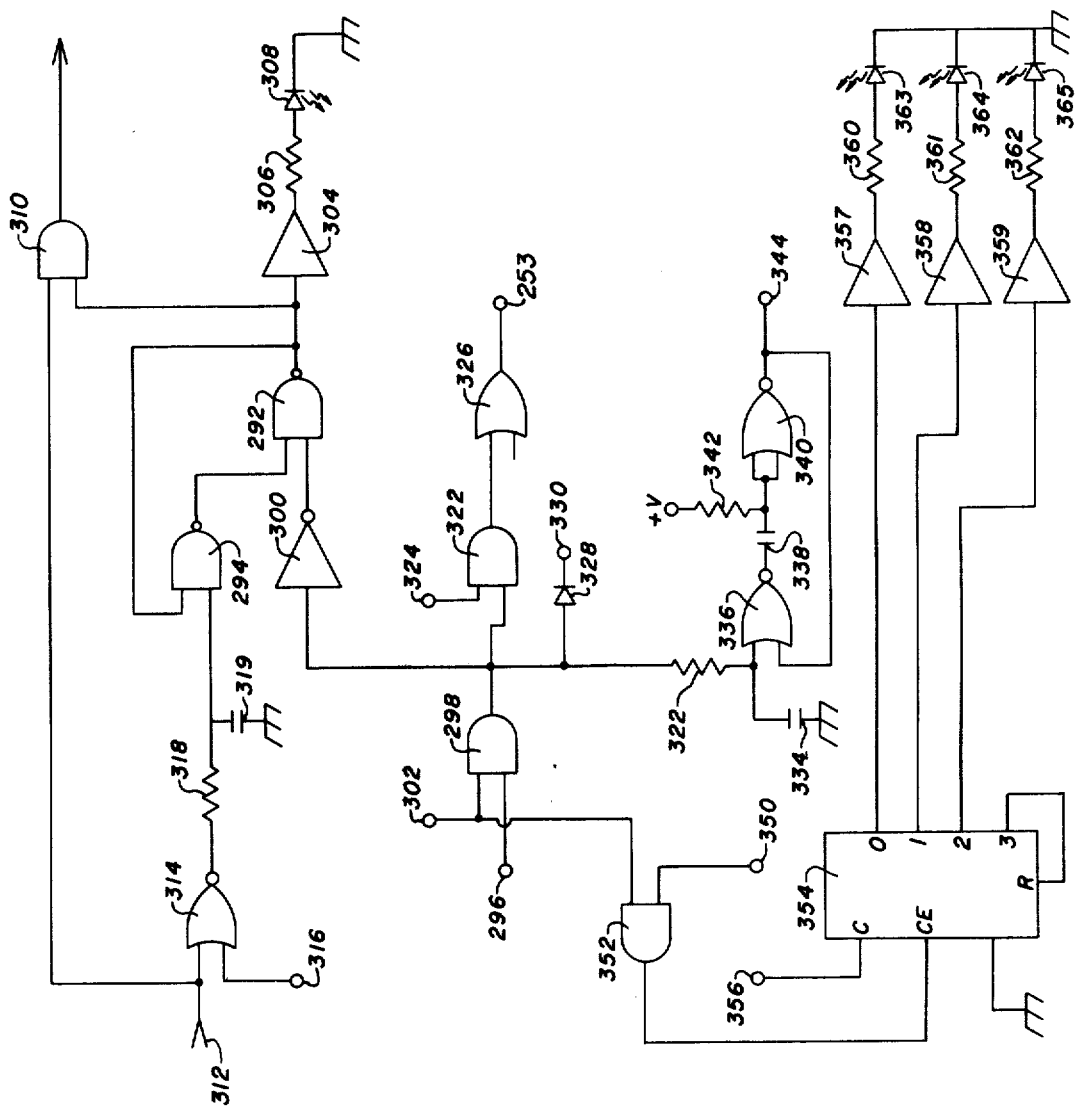

FIG. 5 shows a portion of the control circuit relating to the delay start and wrinkle out options. The circuitry includes the delay start memory circuit 290 comprising a pair of NAND gates 292, 294. The output from the delayed start switch 55 is connected through a terminal 296 to one input of an AND gate 298. The output of AND gate 298 is connected through an inverter 300 to one input of NAND gate 292. The other input of AND gate 298 receives the option enable signal through a terminal 302. Thus, when the options are enabled and the delay start switch 55 is touched, the output of AND gate 298 goes high causing the output of inverter 300 to go logically low and the output of NAND gate 292 to go logically high. This logical high is coupled through an amplifier 304 and a resistor 306 to a light emitting diode 308 which corresponds to the delayed start option indicator 44 in FIG. 2E. The output of AND gate 292 is further connected through an AND gate 310, along with the done timing signal via a terminal 312, to the preset enable of terminal 257 of FIG. 4. The done timing signal on terminal 312 is connected to an input of a NOR gate 314 whose other input is connected to the system reset signal via a terminal 316. The output of NOR gate 314 passes through a delay circuit including a resistor 318 and a capacitor 319 to one input of NAND gate 294. The purpose of the delay circuit is to prevent that input of NAND gate 294 from going from a logical high to a logical low unless a logical low is sustained for a certain period of time at the output of NOR gate 314. The output of AND gate 298 is further connected to an input of AND gate 322 which has the slew clock signal connected to its other input via a terminal 324. The output of AND gate 322 is coupled to the clock terminal of the most significant digit counter 214 through an OR gate 326 and terminal 253. Other inputs of OR gate 326 may be used for coupling other signals to the clock terminal of counter 214 while insuring isolation therebetween. The output of AND gate 298 is further connected through an isolaton diode 328 and a terminal 330 to the up-down directional inputs of counters 212, 213 and 214. The output of AND gate 298 is further connected through a resistor 332 and a capacitor 334, respectively to ground. The junction between resistor 332 and capacitor 334 is connected to one input of a NOR gate 336. The output of NOR gate 336 is connected through a capacitor 338 to both inputs of another NOR gate 340. These inputs are further connected to a positive voltage potential through a resistor 342. The output of NOR gate 340 is connected to the other input of NOR gate 336 and further provides a reset signal for the counters 212, 213 and 214, available through terminal 344. The purpose of resistor 332 and capacitor 334 is to delay the reset signal long enough for the data present on the output terminals of counters 213 and 214 to be transferred to the D-type flip-flops 224-231. The purpose of capacitor 338 and resistor 342 is to limit the amount of time that a logical low signal is applied to the inputs of NOR gate 340. When the output of NOR gate 336 goes from a logical high to a logical low, the logical low appears at the inputs of NOR gate 340 only until the capacitor 338 can charge through resistor 342 to the threshold voltage for a logical high.

The activation for the wrinkle out function is available through a terminal 350 and coupled to one input of a NAND gate 352. The other input of NAND gate 352 is connected to the option enable signal of terminal 302. The output of NAND gate 352 is connected to the clock enable input of a decade counter 354 having ten decoded outputs. The clock input for counter 354 is the slew clock signal available from a terminal 356. The 0, 1, 2 and 3 outputs of the counter 354 are the only ones used. The first three are connected through separate amplifiers 357, 358 and 359 and separate resistors 360, 361 and 362 to light emitting diodes 363, 364 and 365 which correspond to the wrinkle out timing indicators 41, 42 and 43. The other sides of light emitting diodes 363, 364 and 364 are coupled to ground. The "3" output of counter 354 is connected to the reset input thereof. Thus, when the options are enabled and the operator presses the wrinkle out switch 54, the counter slews thrugh three outputs causing the light emitting diodes 363, 364 and 365 to individually illuminate and extinguish in sequence. When the indicator next to the desired air fluff time is illuminated, the operator need only remove his finger from switch 54 to set the drawing apparatus for that particular wrinkle out time period.

FIG. 6 shows the portion of the control circuit used for deactivation at the completion of a drying operation. The "done timing" signal is received on a terminal 370 from the terminal 223 of FIG. 4, and is connected through a resistor 372 to one input of an AND gate 374. A capacitor 376 and a resistor 378 are connected in parallel and between the same input of AND gate 374 and ground to insure that a pulse of sufficient duraction is present prior to activating AND gate 374 and to avoid that activation at the end of the delay start countdown when a done timing signal is momentarily generated. The other input to AND gate 374 is connected to the start LED 44 of FIG. 2E via terminal 380. The output of AND gate 374 is connected to a master/slave delay circuit including six D type flip-flops 381-386 via the D input of gate 381. The flip-flops 381-386 are serially connected having the Q outputs of all except the last flip-flop 386 connected to the D input of the next sequential flip-flop. The clock inputs to flip-flops 381-386 are connected to the slew clock signal via a terminal 388. The output of AND gate 374 is further connected through a diode 387 and a terminal 388 to the alarm terminal 286 of FIG. 4A to activate the alarm circuit 270 at the completion of a drying operation. The output of flip-flop 386 is connected through a resistor 390 to the base of a transistor 392. The emitter of transistor 392 is connected to the base of another transistor 394. The emitter of transistor 394 is connected to ground and to one end of the energizing coil 396 of a power relay. The collectors of transistors 392 and 394 and the other end of relay coil 396 are interconnected and connected through a resistor 398 to a positive voltage potential. Upon receipt of the done timing signal at the end of a drying operation period, a logical one output from AND gate 374 is clocked sequentially through the D type flip-flops 381-386 with each successive pulse of the slew clock signal. When the output of flip-flop 386 is energized, transistors 392 and 394 are turned on causing the relay coil 396 to be shorted and thereby deactivating the relay thereof.

FIG. 7 shows the power supply and timing circuitry for the apparatus 10. An AC voltage is connected to the circuitry via standard plug 400. A door switch 402 and a pair of relay contacts 404 are connected together in parallel and in series with the AC voltage source. This series combination is connected across the parallel circuit of a primary coil for a power transformer 406 and a varistor 408. A pair of terminals 410 and 412 are also connected across this series combination for the purpose of providing power to the apparatus 10. The secondary coil of power transformer 406 is connected to a full wave bridge rectifier 414 and a filtering circuit including a capacitor 416 and a resistor 418. One side of the rectifier filter combination is connected to ground and the other side forms the positive voltage potential at a terminal 420. This positive voltage potential is taken as the cycle enable signal. Upon the opening of the door 12 of apparatus 10, the contacts of switch 402 are connected causing relay coil 396 to energize and relay contacts 404 to close and maintain activation of relay 396. This maintains power to the transformer 406 and rectifier 414 after the door 12 is closed.

The AC output of transformer 406 is further connected through a capacitor 422 to a clock circuit 424 for generating the timing signals used in the timing functions of the apparatus. The outputs of timing circuit 424 are connected to a pair of AND gates 426 and 428. By the operation of counting circuit 424 the output of AND gate 426 generates a pulse once every second and the output of AND gate 428 generates a pulse every minute. The output of AND gate 426 is connected to one input of a NAND gate 430. The other input of NAND gate 430 may be connected to a positive voltage potential via an operable switch 432. Upon closure of switch 432, the positive voltage potential is also connected to both inputs of a NAND gate 434, the output of which is connected to one input of a NAND gate 436. The output of AND gate 428 is connected to the other input of NAND gate 436. The outputs of NAND gates 430 and 436 are connected to separate inputs of a NAND gate 440. The output of NAND gate 440 is available on terminal 442 as the timing signal for the minutes counter 212. It is connected through an AND gate 446 and terminal 448 to terminal 262 of FIG. 4B. The other input 447 of AND gate 446 is connected to terminal 168 of FIG. 3A. The output of NAND gate 440 is further connected to the reset input of counter 424. Thus, the operation of this timing circuit allows the outputting of pulses at either one second or one minute intervals. During normal operation of the apparatus, the one minute interval is chosen and thus the minutes counter 212 is pulsed every minute. During a test operation, switch 432 is closed and the one second interval is thereby chosen. The counter 212 is pulsed every second. This allows an operator to run through and check the operation of the apparatus in a shorter period of time than is available through the simple operation thereof.

Figure 8:
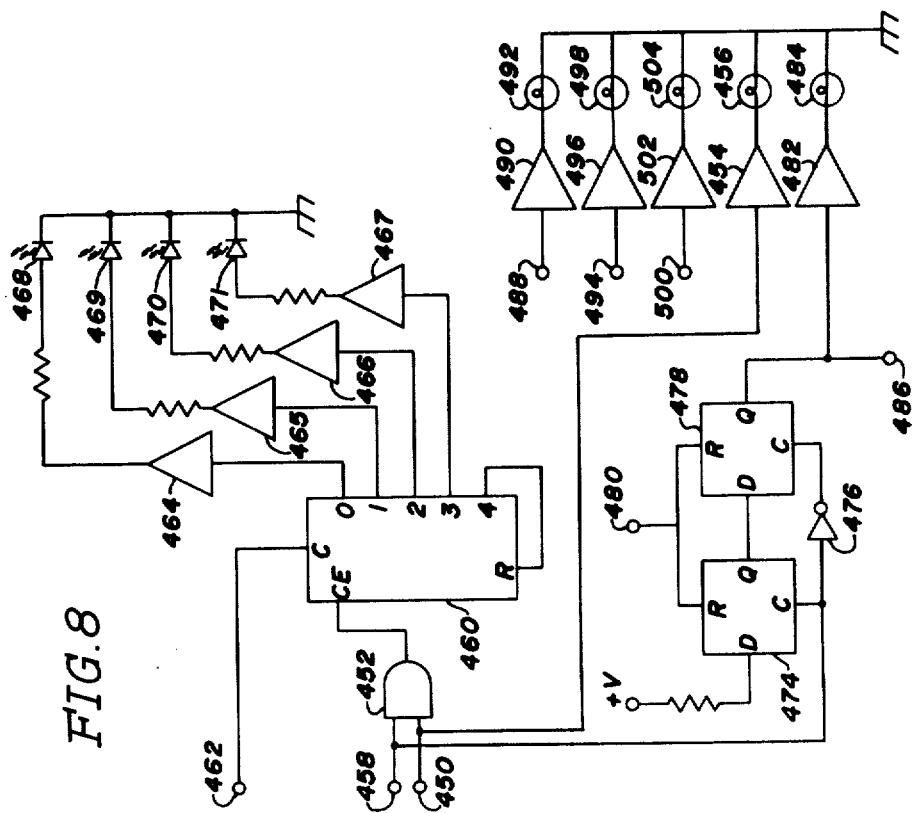

FIG. 8 shows the fabric select or temperature select circuitry and the illumination means for the control panel 16. The fabric select enable signal from terminal 134 of FIG. 3A is connected through a terminal 450 to one input of an AND gate 452 and to the input of an amplifier 454. The output of amplifier 454 is connected to a light bulb 456 which serves as the illumination means located behind the fabric select portion of the control panel 16. The fabric select touch switch 53 is conncted through its respective circuitry and a terminal 458 in FIGS. 3A and 8 and coupled to the other input of AND gate 452. The output of AND gate 452 is connected to the clock enable input of a decade counter 460 having 10 decoded outputs. The slew clock signal is connected through a terminal 462 to the clock input of counter 460. Outputs 0, 1, 2 and 3 of counter 460 are connected through amplifiers 464–467, respectively, to light emitting diodes 468 through 471, respectively. The 4 output of counter 460 is connected to the reset thereof. Thus, when the fabric select enable signal is present at terminal 450 and an operator presses the fabric select touch pad 34, the counter 460 is caused to slew sequentially through the outputs 0 through 3 and cause the light emitting diodes 468 through 471 to sequentially illuminate. These light emitting diodes correspond to the illumination means 28 through 31 located next to the four fabric options on control panel 16. When the light corresponding to the desired option is illuminated, the operator need only remove his finger from the touch pad 34 and counter 460 will remain in that count position and thus program the apparatus for that fabric or temperature selection.

The fabric selector signal is further connected from terminal 458 to the clock terminal of a D type flip-flop 474 and through an inverter 476 to the clock input of another D type flip-flop 478. A positive voltage potential is connected to the D input of flip-flop 474 and the Q output is connected to the D input of flip-flop 478. The reset terminals of flip-flops 474 and 478 are connected in common through a terminal 480 to the system reset. Thus, when the fabric select switch signal is received at terminal 458, flip-flop 474 is clocked and its Q output goes from a logical zero to a logical 1. When the fabric select signal disappears, the flip-flop 478 is clocked and its Q output goes from a logical 0 to a logical 1. The Q output of flip-flop 478 is connected to the input of an amplifier 482, the output of which is connected to the light bulb or illumination means 484 located behind the options section 36 of control panel 16. Thus, the output of flip-flop 478 represents the options enable signal and is available at a terminal 486 in addition to causing the illumination of the options selection area 36 of the control panel 16. Terminal 486 is connected to terminal 302 of FIG. 5 amd tp terminal 169 of FIG. 3A.

The other illumination means for control panel 16 are also shown and include a terminal 488 for receiving the cycle enable signal from terminal 420 of FIG. 7, which terminal 488 is connected through an amplifier 490 to a light bulb 492 for illuminating the cycle selection region 17 of control panel 16. A terminal 494 is coupled to terminal 146 of FIG. 3A for receiving the automatic cycle enable signal therefrom and illuminating the dryness levels. The terminal 494 is connected through an amplifier 496 to a light bulb 498 which illuminates the dryness levels. A terminal 500 is included for coupling to terminal 147 of FIG. 3A and receiving the timed cycle enable signal therefrom. The terminal 500 is connected through an amplifier 502 to a light bulb 504 which illuminates the hours/minutes portion of the display.

Figure 9:
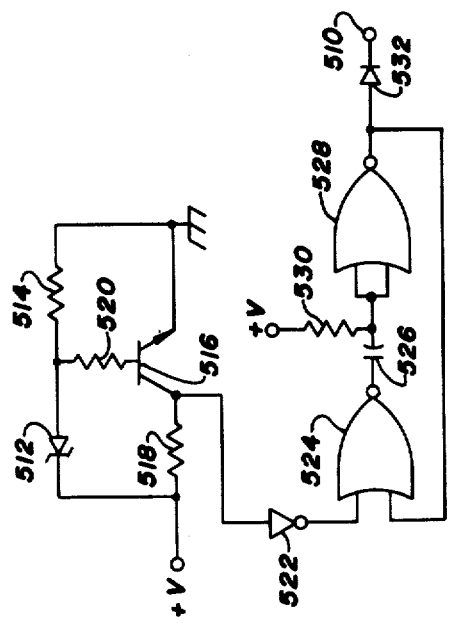

The touch switch 57 of FIG. 3A represents the cancel function and the output of its associated circuitry available on terminal 97 is the system reset for the entire circuitry shown. FIG. 9 shows a further reset circuit having its output at terminal 510 for connection to terminal 97. The circuitry of FIG. 9 provides an initial reset signal upon activation of the apparatus 10. The circuitry includes a zener diode 512 connected in series with a resistor 514, the combination of which is connected across the positive voltage supply. A transistor 516 has its collector connected through a resistor 518 to the positive voltage supply and its emitter connected to ground. A resistor 520 connects the base of transistor 516 to the junction between zener diode 512 and resistor 514. The transistor 516 is connected through an inverter 522 to one input of a NOR gate 524. The output of NOR gate 524 is connected through a capacitor 526 to both inputs of another NOR gate 528. A resistor 530 also connects both inputs of NOR gate 528 to the positive voltage potential. The output of NOR gate 528 is connected to the other input of NOR gate 524. An isolation diode 532 connects the output of NOR gate 528 to the output terminal 510.

In operation, the reverse bias voltage of zener diode 512 is selected to be slightly below the positive voltage potential connected to the cathode thereof. For example, when the positive voltage potential is +15 volts, the reverse bias voltage of zener diode 512 is selected at approximately 13 volts. By this selection, when the circuit is initially activated and the voltage at the positive voltage potential begins to climb, zener diode 512 does not conduct current and thus the transistor 516 is also nonconducting. This causes a positive voltage to appear at the collector of transistor 516 and a logical 0 to appear at the output of inverter 522. The positive voltage potential applied to the inputs of NOR gate 528 through resistor 530 causes the output of NOR gate 528 to also be a logical 0. Thus, both inputs to NOR gate 524 are a logical 0 and the output thereof is a logical 1. During this time, the output voltage at terminal 510 is isolated by diode 532 from the logical 0 at the output of NOR gate 528. As the voltage across zener diode 512 builds and passes its reverse bias breakdown voltage, the transistor 516 is turned on by a positive voltage present at its base when zener diode 512 begins to conduct. This causes a logical 0 to appear at the input of inverter 522 and a logical high at the output thereof. This high switches the output of NOR gate 524 from a logical high to a logical low which is transmitted by capacitor 526 to a temporary logical low at the input of NOR gate 528. Given the proper time constant for the combination of capacitor 526 and resistor 530, capacitor 526 gradually charges and the logical low appearing at the input of NOR gate 528 changes to a logical high. During the time that the input to NOR gate 528 is a logical low, the output thereof is a logical high which is transmitted through the diode 532 to the output terminal 510 causing the resetting of the entire system. Once capacitor 526 is charged, the output of NOR gate 528 returns to a logical low and this portion of the circuit is again isolated from the system reset circuit. Thusly, a temporary reset signal is generated on the system reset line upon initial activation of the circuit.

For purposes of an overall view of the operation of the system, the apparatus programming is sequenced by the present invention in the following manner. Upon loading of the drying apparatus, the switch 402 is closed causing the energization of relay coil 396 via the voltage at terminal 420 and the closure of contacts 404 to maintain that energization. The voltage at terminal 420 is further connected to terminal 488 to illuminate light bulb 492 and the cycle selection portion 17 of the control panel 16. Terminal 420 is further coupled to terminal 99 to enable selection of either the auto or timed function of the apparatus. If the automatic function is selected by touching the switch 50, the signal at terminal 146 is a logical high which enables the counter 148 and illuminates the light bulb 498. This causes the dry versus damp dryness levels to appear on control panel 16. Upon pressing the dryness level/time select switch 52, the counter 148 causes segments of the most significant digit 182 and the least significant digit 186 to sequentially illuminate beneath the dry and damp dry selections. Upon illumination of the segments below the desired dryness level the operator need only remove his finger from the switch 52 to cause the counter 148 to stop and thereby program that desired dryness level. To select the timed drying mode, the operator presses the switch 51 which causes illumination of light bulb 504 located beneath the hours/minutes display portion of control panel 16. Upon pressing the switch 52, the output signal at terminal 145 causes the tens of minutes counter 213 to slew upwardly displaying selections of drying times in ten minute intervals. Upon reaching the desired drying time, the operator need only remove his finger from the switch 52 to program the apparatus for that drying time.

When the operator removes his finger from the switch 52, the signal at terminal 134 enables the fabric selection or temperature selection portion of the circuit shown in FIG. 8, and illuminates the light bulb 456 located behind the fabric selection portion of control panel 16. To select a fabric type or temperature level, the operator places hig finger on touch switch 53 which causes the counter 460 to slew its four operative outputs and cause the light emitting diodes 468 through 471 to sequentially illuminate. When the diode next to the desired fabric type or temperature is illuminated, the operator need only remove his finger from touch switch 53 to program the apparatus for that desired selection.

The removal of the operator's finger from touch switch 53 causes the illumination of light bulb 484 located behind the options portion 34 of control panel 16 and enables the selection of the various options therein. Should the operator choose a delayed start function by pressing touch switch 55, a signal at terminal 330 causes the most significant digit counter 214 to operate in the ascending direction and the output of OR gate 326 clocks that counter 214 causing optional delay times to sequence through the most significant digit display 182 in one hour intervals. Upon reaching the desired delay time, the operator need only remove his finger from touch switch 55 to program the apparatus for that delay time. To select the wrinkle out function which is a not heat air fluff operation at the end of the heated drying cycle, the operator touches switch 54 which causes the clock 354 to sequence its three operative outputs thereby causing light emitting diodes 363, 364 and 365 to be sequentially illuminated next to the available wrinkle out times of 30, 60 and 90 seconds. When the light next to the desired wrinkle out time is illuminated, the operator need only remove his finger from touch switch 54 to program the apparatus for that time.

The programming now having been completed, the operator may start the drying operation by pressing touch pad 56 which changes the output of flip-flop 166 to a logical 1 thus activating the apparatus 10 by a signal available at terminal 168. If the operator has made a mistake in his programming, he may completely reprogram the apparatus by pressing touch pad 57 which activates the system reset causing all illumination to disappear except for the light bulb 492 located behind the cycle selection option.

It is readily apparent from the above description that the apparatus and method of the present invention significantly improves the programming of an apparatus. Its application has been described in respect to an apparatus having a large number of related and not related programming options and presents the programming in a logical manner to facilitate the complete and proper programming of the apparatus. THe present invention minimizes the possibility that a mistake will be made either in the exclusion of a specific selection or the occurrence of an improper selection. It does this in a manner which enables a great variety of options, including both a highly automated operating mode or an operating mode having many adjustable variables. The manner in which the programming is accomplished is suitable for reliable use by even the most non-technically oriented operator and is thus valuable in consumer applications. In apparatus having the present touch to programming may be used competently by the least technically oriented members of a family while allowing the operational variability which might be desired and appreciated by a more technically competent member. The control of the portions which are displayed not only enhances the programming function but also allows the control panel to compliment the design of the remainder of the apparatus. This feature is significant in the respect that many purchase decisions of household appliances are made on the basis of their appearance and their aesthetic contributions to the surroundings in which they will operate.

The embodiment of the present invention shown and described above is intended to be taken in an illustrative and not a limiting sense. It is readily apparent that many changes and variations may be made to the present embodiment by someone skilled in the art without departing from the scope of the present invention as defined in the appended claims.

What is claimed is:

1. An apparatus having at least a plurality of different control functions, comprising:
    a control panel including a plurality of separate portions each of which corresponds to a different said control function;
    means for causing said control panel to appear blank prior to initial activation of said apparatus;
    means for initially activating said apparatus; and
    means responsive to said means for initially activating for indicating and allowing selection of said different control functions, said means for indicating and allowing selection including means for sequentially displaying said control functions in their respective control panel portions to allow sequential selection thereof, said means for sequentially displaying including means for sequentially illuminating each of said portions of said control panel in response to said means for initially activating and in response to selections of control functions corresponding to illuminated control panel portions, said selected control functions remaining illuminated during the sequential illumination of further portions of said control panel.

2. The apparatus of claim 1, wherein said means for displaying includes light transmissive material located in said control panel and said means for illuminating is located behind said control panel.

3. The apparatus of claim 1, wherein said means for indicating and allowing selection of said different control functions includes means for inputting a selection of control functions as they appear on said control panel.

4. The apparatus of claim 3, wherein said means for inputting are displayed on said separate portions of said control panel in correspondence with said control functions being displayed thereon.

5. The apparatus of claim 1, wherein said apparatus is a clothes dryer.

6. The appliance of claim 5, wherein the sequence of control functions to be displayed on said control panel is automatic, timed, dryness, time, temperature and other options.

7. The apparatus of claim 1, further comprising a door, wherein said means for initially activating said apparatus includes a switch adapted to be activated by the opening and closing of said door.

8. A control panel for an apparatus having at least a plurality of control functions, comprising:
    means for causing said control panel to appear blank prior to initial activation of said apparatus;
    a plurality of separate portions located on said control panel and corresponding to different control functions;
    means for initially activating said apparatus; and
    means responsive to said means for initially activating for indicating and allowing selection of said different control functions, said means for indicating and allowing selection including means for sequentially displaying said control functions in their corresponding control panel portions to allow selection thereof, said means for sequentially displaying including means for sequentially illuminating each of said portions of said control panel in response to said means for initially activating and in response to selections of control functions corresponding to illuminated control panel portions, said selected control functions remaining illuminated during the sequential illumination of further portions of said control panel.

9. A method for displaying a plurality of selectable control functions of an apparatus, comprising the steps of:
    causing a control panel including means for displaying each of said control functions on separate portions thereof to appear blank prior to initial activation of said apparatus; and
    causing said control functions to be sequentially displayed on said control panel by sequential illumination of said separate portions after initial activation of said apparatus and in response to a selection of the previously displayed control functions, said previously displayed control functions remaining illuminated during said sequential illumination of further portions of said control panel.

10. The method of claim 9, wherein said illumination of said separate portions includes backlighting said control panel to illuminate light transmissive material.

11. The method of claim 9, further comprising enabling the inputting of selections of said control functions as displayed on said control panel.

12. The method of claim 11, wherein said enabling the inputting of selections include causing said input means to be displayed on said control panel portions in correspondence with said control functions displayed thereon.

* * * * *